(No Model.)
A. E. KENNELLY & J. F. OTT.
ELECTRICAL METER FOR THREE WIRE SYSTEMS.
No. 479,168. Patented July 19, 1892.
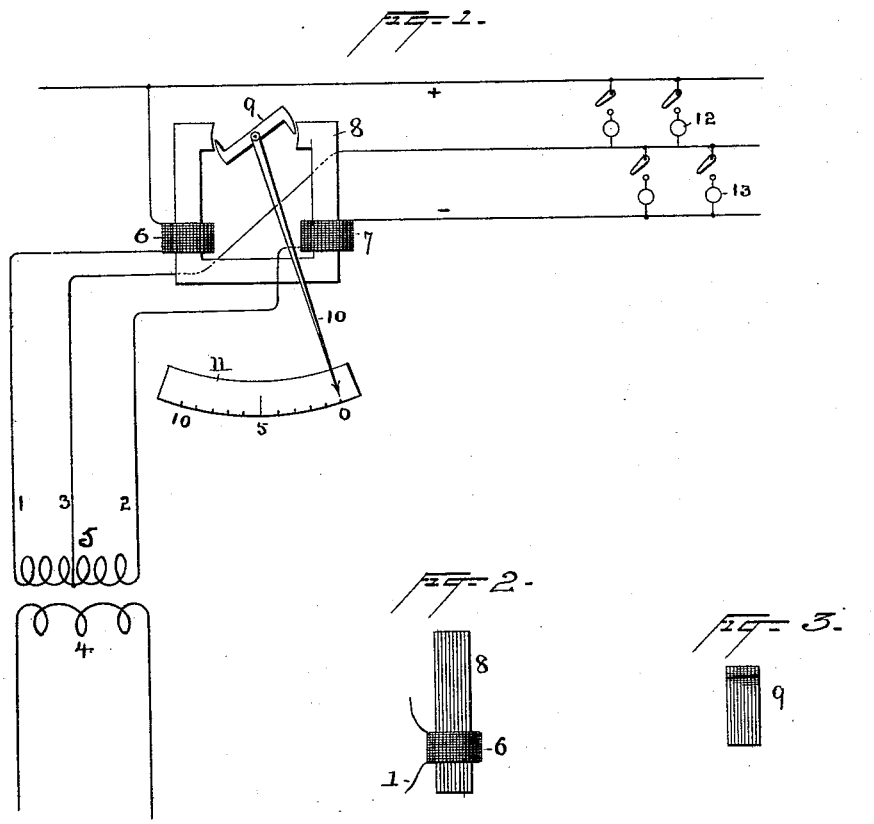
Witnesses
Norris G. Clark.
N. F. Oberlies
Inventors
A. E. Kennelly & J. F. Ott.
By their Attorneys
Dyer & Seely

UNITED STATES PATENT OFFICE.

ARTHUR E. KENNELLY AND JOHN F. OTT, OF ORANGE, NEW JERSEY, ASSIGNORS TO THE EDISON GENERAL ELECTRIC COMPANY, OF NEW YORK, N. Y.

ELECTRICAL METER FOR THREE-WIRE SYSTEMS.

SPECIFICATION forming part of Letters Patent No. 479,168, dated July 19, 1892.

Application filed October 21, 1891. Serial No. 409,379. (No model.)

*To all whom it may concern:*

Be it known that we, ARTHUR E. KENNELLY, a subject of the Queen of Great Britain, and JOHN F. OTT, a citizen of the United States, residing at Orange, in the county of Essex and State of New Jersey, have invented a certain new and useful Improvement in Electrical Meters for Three-Wire Systems, of which the following is a specification.

This invention relates to the class of meters in which current used in a three-wire system is measured by a single apparatus, there being a coil to which the positive main and an independent coil to which the negative main are connected, both coils operating on the same pointer or indicator.

Our meter is designed and adapted particularly for measuring alternating currents; and the invention consists in the features of construction and combination hereinafter specifically pointed out and covered by the several clauses of the claims.

In the drawings, Figure 1 is a diagram of a system with our improved meter connected thereto. Fig. 2 is a view of the magnet at right angles to Fig. 1, and Fig. 3 is a similar view of the armature.

1, 2, and 3 are the positive, negative, and neutral mains of a three-wire system, to which system current is supplied by suitable means—for example, by a converter consisting of a single primary 4, connected to a suitable alternating or pulsatory current generator, and a secondary 5, the terminals of which are connected to mains 1 2 and the central point of which is connected to conductor 3. The conductors 1 2 are connected to the meter-coils 6 7 on the legs of a U-shaped core 8, said core being laminated, preferably being built up of several pieces of sheet metal, as indicated by the edge view, Fig. 2. The coils 6 7 co-operate—that is, they act on the magnet in such manner as to move the armature and the pointer carried thereby in the same direction. We also construct the armature 9, which is pivoted centrally between the poles of the magnet and has on its axis a pointer 10, of several layers of sheet metal placed side by side, as indicated in Fig. 3, and insulated or uninsulated from each other.

11 is the scale, suitably graduated, over which the pointer 10 may be moved.

12 13 are lamps or other translating devices which can be thrown into use at will on their respective sides of the system. The apparatus is so adjusted that when no transmitters are in use the pointer 10 will be at the zero-point. If translating devices 12 are thrown into circuit, the pointer is moved a certain distance, depending on the number of translating devices thrown into use, or, in other words, on the current consumed. The same will be true if translating devices 13 are thrown into circuit, and if translating devices 12 13 are thrown into use simultaneously their effect will be added—that is, if all of the translating devices 12 take current which is sufficient to move the pointer to 5 on the scale, and the same is true of the translating devices 13, the pointer will move to 10. Owing to the fact that the magnet-core or core and armature is laminated, so that changes in the magnetic strength and polarity are readily effected, and so that each reversal of polarity of current erases all traces of past magnetization, there is no magnetic stick between the magnet core and armature arising from the residual magnetism which would make its indication err, as would be the case with a solid magnet, especially in a continuous-current meter.

What we claim is—

1. The combination, in a meter, of a single core, co-operating coils thereon, each coil being connected or adapted to be connected to a separate main, an armature, and an indicating device moved thereby, substantially as described.

2. The combination, in a meter adapted for alternating-current systems, of a laminated core, co-operating coils thereon, each coil being connected or adapted to be connected to a separate main, an armature, and an indicating device moved thereby, substantially as described.

3. The combination, in a meter adapted for alternating-current systems, of a laminated core, co-operating coils thereon, each coil being connected or adapted to be connected to a separate main, a laminated armature, and a pointer or indicating device moved thereby, substantially as described.

4. The combination, in a meter adapted for alternating-current systems, of co-operating coils adapted to be connected to separate mains, laminated pole-pieces therefor, an armature, and an indicator, substantially as described.

5. The combination, in a three-wire system, of the positive, negative, and neutral mains, the source of alternating current connected thereto, and a single meter having two co-operating coils, one connected to a positive and one connected to a negative main, substantially as described.

6. The combination, with positive and negative wires and a source of alternating current connected thereto, of a meter having two co-operating coils, one connected to the positive and one connected to the negative wire, a soft-iron armature therefor, and an indicator or pointer moved thereby, substantially as described.

This specification signed and witnessed this 8th day of October, 1891.

ARTHUR E. KENNELLY.
JOHN F. OTT.

Witnesses:
CHARLES M. CATLIN,
JOHN F. RANDOLPH.